US010956480B2

(12) United States Patent
Beaumont et al.

(10) Patent No.: US 10,956,480 B2
(45) Date of Patent: Mar. 23, 2021

(54) SYSTEM AND METHOD FOR GENERATING DIALOGUE GRAPHS

(71) Applicant: Nuance Communications, Inc., Burlington, MA (US)

(72) Inventors: Jean-Francois Beaumont, Verdun (CA); Nastaran Jafarpour Khameneh, Montreal (CA); Peter Stubley, Beaconsfield (CA); Paul A. Tepper, Paramus, NJ (US); Abhishek Rohatgi, Dollard-des-Ormeaux (CA); Flaviu Gelu Negrean, Verdun (CA); Marco Antonio Padron Chavez, Longueuil (CA)

(73) Assignee: Nuance Communications, Inc., Burlington, MA (US)

( * ) Notice: Subject to any disclaimer, the term of this patent is extended or adjusted under 35 U.S.C. 154(b) by 257 days.

(21) Appl. No.: 16/023,220

(22) Filed: Jun. 29, 2018

(65) Prior Publication Data

US 2020/0004878 A1    Jan. 2, 2020

(51) Int. Cl.
*G06F 16/35* (2019.01)
*G10L 15/26* (2006.01)
*G10L 15/02* (2006.01)
*G06F 16/683* (2019.01)

(52) U.S. Cl.
CPC .......... *G06F 16/353* (2019.01); *G06F 16/685* (2019.01); *G10L 15/02* (2013.01); *G10L 15/26* (2013.01)

(58) Field of Classification Search
CPC ..... G06F 16/353; G06F 16/685; G10L 15/02; G10L 15/26
See application file for complete search history.

(56) References Cited

U.S. PATENT DOCUMENTS

| 2005/0278180 | A1* | 12/2005 | O'Neill ................... G10L 15/22 704/275 |
| 2006/0020917 | A1 | 1/2006 | Hying et al. |
| 2006/0080107 | A1* | 4/2006 | Hill ...................... G10L 15/1822 704/275 |
| 2009/0112588 | A1* | 4/2009 | Kummamuru .......... G10L 15/04 704/245 |
| 2011/0238409 | A1* | 9/2011 | Larcheveque ...... G10L 15/1815 704/9 |
| 2012/0156660 | A1* | 6/2012 | Kwon ...................... G09B 5/06 434/185 |
| 2012/0173243 | A1* | 7/2012 | Anand .................... G06F 40/40 704/270.1 |

(Continued)

OTHER PUBLICATIONS

International Search Report and Written Opinion of the International Searching Authority for International PCT Application No. PCT/US2019/040128 dated Sep. 23, 2019.

*Primary Examiner* — Jensen Hu
(74) *Attorney, Agent, or Firm* — Brian J. Colandreo; Michael T. Abramson; Holland & Knight LLP

(57) ABSTRACT

A method, computer program product, and computing system for automatically generating a dialogue graph is executed on a computing device and includes receiving a plurality of conversation data. A plurality of utterance pairs from the plurality of conversation data may be clustered into a plurality of utterance pair clusters. A dialogue graph may be generated with a plurality of nodes representative of the plurality of utterance pair clusters.

12 Claims, 7 Drawing Sheets

(56) References Cited

U.S. PATENT DOCUMENTS

| | | | |
|---|---|---|---|
| 2014/0067375 A1* | 3/2014 | Woofers | G06F 40/40 |
| | | | 704/9 |
| 2017/0116173 A1* | 4/2017 | Lev-Tov | H04M 3/493 |
| 2018/0012231 A1 | 1/2018 | Sapoznik et al. | |
| 2018/0060302 A1 | 3/2018 | Liang et al. | |
| 2018/0097749 A1* | 4/2018 | Ventura | H04L 51/16 |
| 2019/0182382 A1* | 6/2019 | Mazza | G06F 16/3329 |

* cited by examiner

SYSTEM AND METHOD FOR GENERATING DIALOGUE GRAPHS

TECHNICAL FIELD

This disclosure relates to virtual assistant development systems and methods and, more particularly, to systems and methods for generating dialogue graphs.

BACKGROUND

The creation of virtual agents or virtual assistants often requires developers to review and understand interactions between various parties from a massive amount of chat transcripts. Rather than spending the time to review these chat transcripts, developers often spend a lot of time going back and forth with subject matter experts to determine how to develop virtual assistants. As such, the development of virtual assistants may experience a bottleneck when creating dialogue for virtual assistants and/or when creating dialogue for specific applications of virtual assistants.

SUMMARY OF DISCLOSURE

In one implementation, a computer-implemented method for automatically generating a dialogue graph is executed on a computing device and includes receiving a plurality of conversation data. A plurality of utterance pairs from the plurality of conversation data may be clustered into a plurality of utterance pair clusters. A dialogue graph may be generated with a plurality of nodes representative of the plurality of utterance pair clusters.

One or more of the following features may be included. Receiving the plurality of conversation data may include one or more of receiving a plurality of chat transcripts and converting one or more audio recordings of one or more conversations into one or more text-based representations of the one or more conversations. Clustering the plurality of utterance pairs may include clustering the plurality of conversation data into a plurality of topic clusters. Clustering the plurality of conversational data into a plurality of topic clusters may include generating a plurality of feature vectors representative of the plurality of conversation data and comparing the plurality of feature vectors representative of the plurality of conversation data. Clustering the plurality of utterance pairs may include, for at least one topic cluster of the plurality of topic clusters, generating a plurality of feature vectors representative of the plurality of utterance pairs and comparing the plurality of feature vectors representative of the plurality of utterance pairs. One or more labels for at least one node of the plurality of nodes representative of the plurality of utterance pair clusters may be generated. One or more modifications to the dialogue graph may be received.

In another implementation, a computer program product resides on a computer readable medium and has a plurality of instructions stored on it. When executed by a processor, the instructions cause the processor to perform operations including receiving a plurality of conversation data. A plurality of utterance pairs from the plurality of conversation data may be clustered into a plurality of utterance pair clusters. A dialogue graph may be generated with a plurality of nodes representative of the plurality of utterance pair clusters.

One or more of the following features may be included. Receiving the plurality of conversation data may include one or more of receiving a plurality of chat transcripts and converting one or more audio recordings of one or more conversations into one or more text-based representations of the one or more conversations. Clustering the plurality of utterance pairs may include clustering the plurality of conversation data into a plurality of topic clusters. Clustering the plurality of conversational data into a plurality of topic clusters may include generating a plurality of feature vectors representative of the plurality of conversation data and comparing the plurality of feature vectors representative of the plurality of conversation data. Clustering the plurality of utterance pairs may include, for at least one topic cluster of the plurality of topic clusters, generating a plurality of feature vectors representative of the plurality of utterance pairs and comparing the plurality of feature vectors representative of the plurality of utterance pairs. One or more labels for at least one node of the plurality of nodes representative of the plurality of utterance pair clusters may be generated. One or more modifications to the dialogue graph may be received.

In another implementation, a computing system includes a processor and memory is configured to perform operations including receiving a plurality of conversation data. A plurality of utterance pairs from the plurality of conversation data may be clustered into a plurality of utterance pair clusters. A dialogue graph may be generated with a plurality of nodes representative of the plurality of utterance pair clusters.

One or more of the following features may be included. Receiving the plurality of conversation data may include one or more of receiving a plurality of chat transcripts and converting one or more audio recordings of one or more conversations into one or more text-based representations of the one or more conversations. Clustering the plurality of utterance pairs may include clustering the plurality of conversation data into a plurality of topic clusters. Clustering the plurality of conversational data into a plurality of topic clusters may include generating a plurality of feature vectors representative of the plurality of conversation data and comparing the plurality of feature vectors representative of the plurality of conversation data. Clustering the plurality of utterance pairs may include, for at least one topic cluster of the plurality of topic clusters, generating a plurality of feature vectors representative of the plurality of utterance pairs and comparing the plurality of feature vectors representative of the plurality of utterance pairs. One or more labels for at least one node of the plurality of nodes representative of the plurality of utterance pair clusters may be generated. One or more modifications to the dialogue graph may be received.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
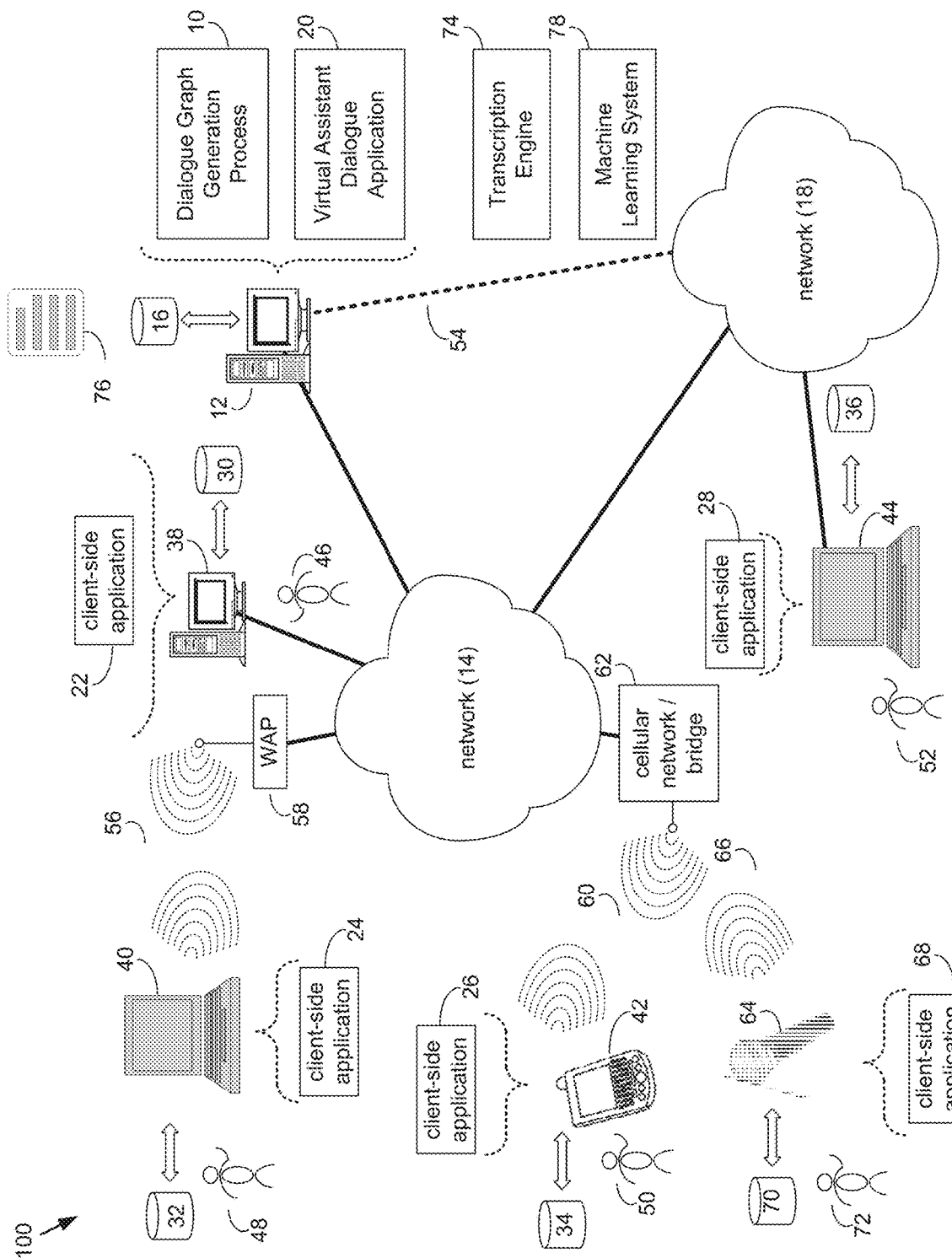
FIG. 1 is a diagrammatic view of a dialogue graph generation process coupled to a distributed computing network.
Figure 2:
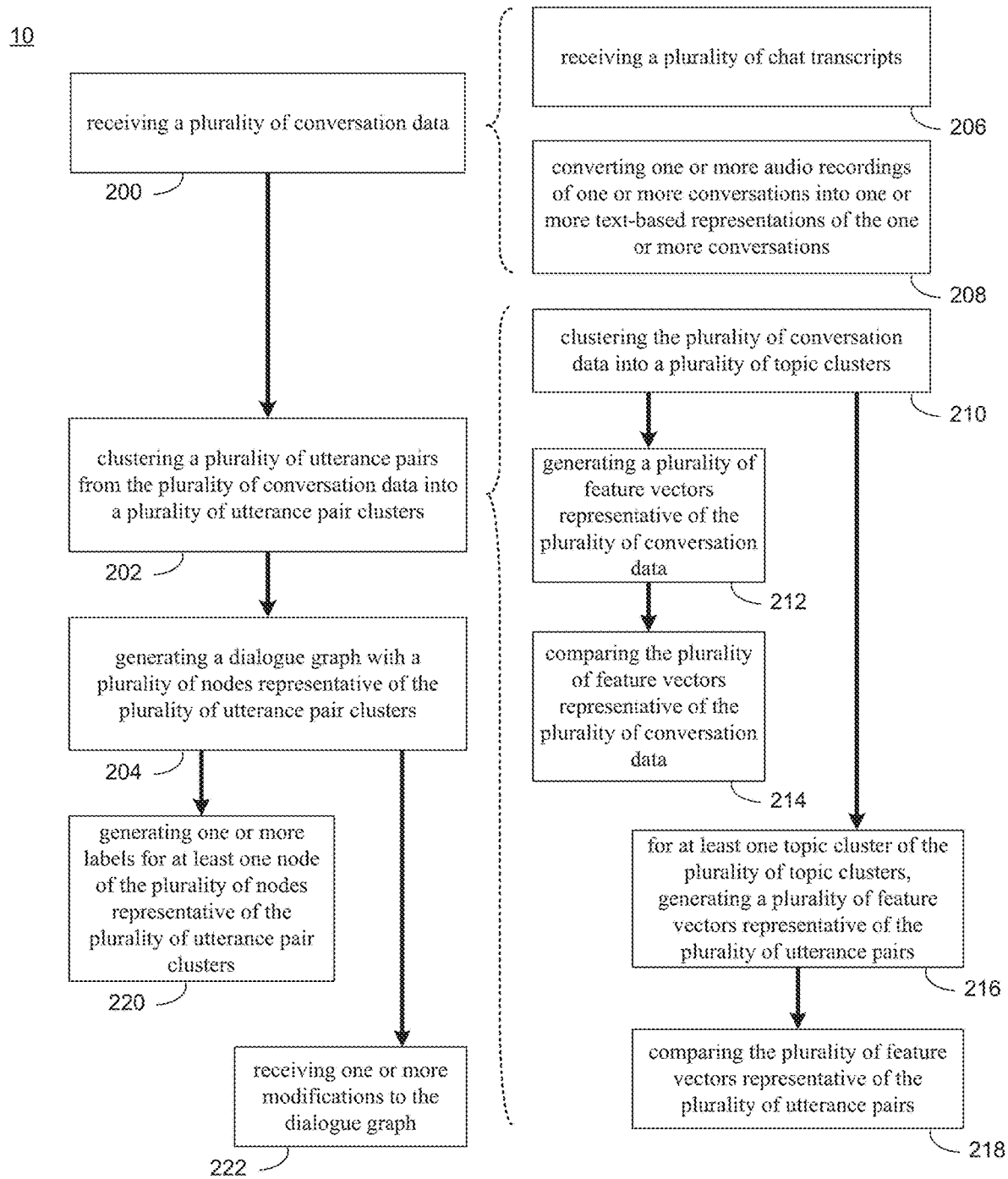
FIG. 2 is a flow chart of one implementation of the dialogue graph generation process of FIG. 1.

Referring now to FIG. 1, there is shown dialogue graph generation process 10 that may reside on and may be executed by a computing device 12, which may be connected to a network (e.g., network 14) (e.g., the internet or a local area network). Examples of computing device 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computing device 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, a dialogue graph generation process, such as dialogue graph generation process 10 of FIG. 1, may receive a plurality of conversation data. A plurality of utterance pairs from the plurality of conversation data may be clustered into a plurality of utterance pair clusters. A dialogue graph may be generated with a plurality of nodes representative of the plurality of utterance pair clusters.

The instruction sets and subroutines of dialogue graph generation process 10, which may be stored on storage device 16 coupled to computing device 12, may be executed by one or more processors (not shown) and one or more memory architectures (not shown) included within computing device 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Dialogue graph generation process 10 may be a stand-alone application that interfaces with an applet/application that is accessed via client applications 22, 24, 26, 28, 66. In some embodiments, dialogue graph generation process 10 may be, in whole or in part, distributed in a cloud computing topology. In this way, computing device 12 and storage device 16 may refer to multiple devices, which may also be distributed throughout network 14 and/or network 18.

Computing device 12 may execute a virtual assistant dialogue generation application (e.g., virtual assistant dialogue application 20), examples of which may include, but are not limited to, virtual assistant development applications, virtual assistant transcript generation applications, automated transcription applications and engines, call-center management applications, etc. including those available from Nuance Communications, Inc. Dialogue graph generation process 10 and/or virtual assistant dialogue application 20 may be accessed via client applications 22, 24, 26, 28, 68. Dialogue graph generation process 10 may be a stand-alone application, or may be an applet/application/script/extension that may interact with and/or be executed within virtual assistant dialogue application 20, a component of virtual assistant dialogue application 20, and/or one or more of client applications 22, 24, 26, 28, 68. Virtual assistant dialogue application 20 may be a stand-alone application, or may be an applet/application/script/extension that may interact with and/or be executed within dialogue graph generation process 10, a component of dialogue graph generation process 10, and/or one or more of client applications 22, 24, 26, 28, 68. One or more of client applications 22, 24, 26, 28, 68 may be a stand-alone application, or may be an applet/application/script/extension that may interact with and/or be executed within and/or be a component of dialogue graph generation process 10 and/or virtual assistant dialogue application 20. Examples of client applications 22, 24, 26, 28, 68 may include, but are not limited to, applications that receive queries to search for content from one or more databases, servers, cloud storage servers, etc., a textual and/or a graphical user interface, a customized web browser, a plugin, an Application Programming Interface (API), or a custom application. The instruction sets and subroutines of client applications 22, 24, 26, 28, 68 which may be stored on storage devices 30, 32, 34, 36, coupled to client electronic devices 38, 40, 42, 44 may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computing device 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Microsoft® Windows®; Mac® OS X®; Red Hat® Linux®, Windows® Mobile, Chrome OS, Blackberry OS, Fire OS, or a custom operating system.

One or more of client applications 22, 24, 26, 28, 68 may be configured to effectuate some or all of the functionality of dialogue graph generation process 10 (and vice versa). Accordingly, dialogue graph generation process 10 may be a purely server-side application, a purely client-side application, or a hybrid server-side/client-side application that is cooperatively executed by one or more of client applications 22, 24, 26, 28, 68 and/or dialogue graph generation process 10.

One or more of client applications 22, 24, 26, 28, 68 may be configured to effectuate some or all of the functionality of virtual assistant dialogue application 20 (and vice versa). Accordingly, virtual assistant dialogue application 20 may be a purely server-side application, a purely client-side application, or a hybrid server-side/client-side application that is cooperatively executed by one or more of client applications 22, 24, 26, 28, 68 and/or virtual assistant dialogue application 20. As one or more of client applications 22, 24, 26, 28, 68 dialogue graph generation process 10, and virtual assistant dialogue application 20, taken singly or in any combination, may effectuate some or all of the same functionality, any description of effectuating such functionality via one or more of client applications 22, 24, 26, 28, 68 dialogue graph generation process 10, virtual assistant dialogue application 20, or combination thereof, and any described interaction(s) between one or more of client applications 22, 24, 26, 28, 68 dialogue graph generation process 10, virtual assistant dialogue application 20, or combination thereof to effectuate such functionality, should be taken as an example only and not to limit the scope of the disclosure.

Users 46, 48, 50, 52 may access computing device 12 and dialogue graph generation process 10 (e.g., using one or more of client electronic devices 38, 40, 42, 44) directly or indirectly through network 14 or through secondary network 18. Further, computing device 12 may be connected to network 14 through secondary network 18, as illustrated with phantom link line 54. Dialogue graph generation process 10 may include one or more user interfaces, such as browsers and textual or graphical user interfaces, through which users 46, 48, 50, 52 may access dialogue graph generation process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 800.11a, 800.11b, 800.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14. In some implementations, audio recording device 64 may be wirelessly coupled to network 14 via wireless communication channel 66 established between client electronic device 42 and cellular network/bridge 62, which is shown directly coupled to network 14. Storage device 70 may be coupled to audio recording system 64 and may include but is not limited to: hard disk drives; flash drives, tape drives; optical drives; RAID arrays; random access memories (RAM); and read-only memories (ROM). User 72 may access computing device 12 and dialogue graph generation process 10 (e.g., using one or more of audio recording system 64) directly or indirectly through network 14 or through secondary network 18.

Some or all of the IEEE 800.11x specifications may use Ethernet protocol and carrier sense multiple access with collision avoidance (i.e., CSMA/CA) for path sharing. The various 800.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

As discussed above and referring also at least to FIGS. 2-7, dialogue graph generation process 10 may receive 200 at a computing device, a plurality of conversation data. A plurality of utterance pairs from the plurality of conversation data may be clustered 202 into a plurality of utterance pair clusters. A dialogue graph may be generated 204 with a plurality of nodes representative of the plurality of utterance pair clusters.

In some implementations consistent with the present disclosure, systems and methods may be provided for automatically generating dialogue graphs from a plurality of conversation data. In the development of virtual assistants, significant time and resources are often required to develop dialogue for virtual assistants. For example, a business may utilize a virtual assistant to address certain customer service needs. A virtual assistant may be developed to receive input dialogue from users to generate certain responses and functionality. As will be discussed in greater detail below, dialogue graph generation process 10 may generate a dialogue graph to represent possible paths from a plurality of conversation data. From these generated dialogue graphs, virtual assistant developers and/or automated virtual assistant dialogue development tools may automatically and/or more efficiently generate dialogue for virtual assistants.

In some implementations, dialogue graph generation process 10 may generate dialogue graphs that may be used for analytics. For example, with a dialogue graph generated by dialogue graph generation process 10, a user may view, explore, and understand conversational transcript data sets or conversational data. This may allow users to understand what is happening in their data (e.g., conversations between users and/or agents and users). The generated dialogue graphs may also help users make decisions about their spending efforts in automating conversations with virtual assistants (e.g., whether to develop high volume conversations, difficult conversations, etc.). In some implementations, dialogue graph generation process 10 may leverage conversational data to generate dialogue graphs to help users visualize and build example conversations. For example, embodiments of the generated dialogue graphs may be used for requirements gathering and authoring dialogue for virtual assistants. For requirements gathering, the generated dialogue graphs may be used to build a requirements document which may generally define required portions of dialogue for a given conversation model. In some implementations, the requirements document may be built upon to implement a virtual assistant automation process or application. Regarding authoring, the generated dialogue graph may be used to build virtual assistant dialogues directly and automatically (e.g., via a virtual assistant development application).

Figure 3:
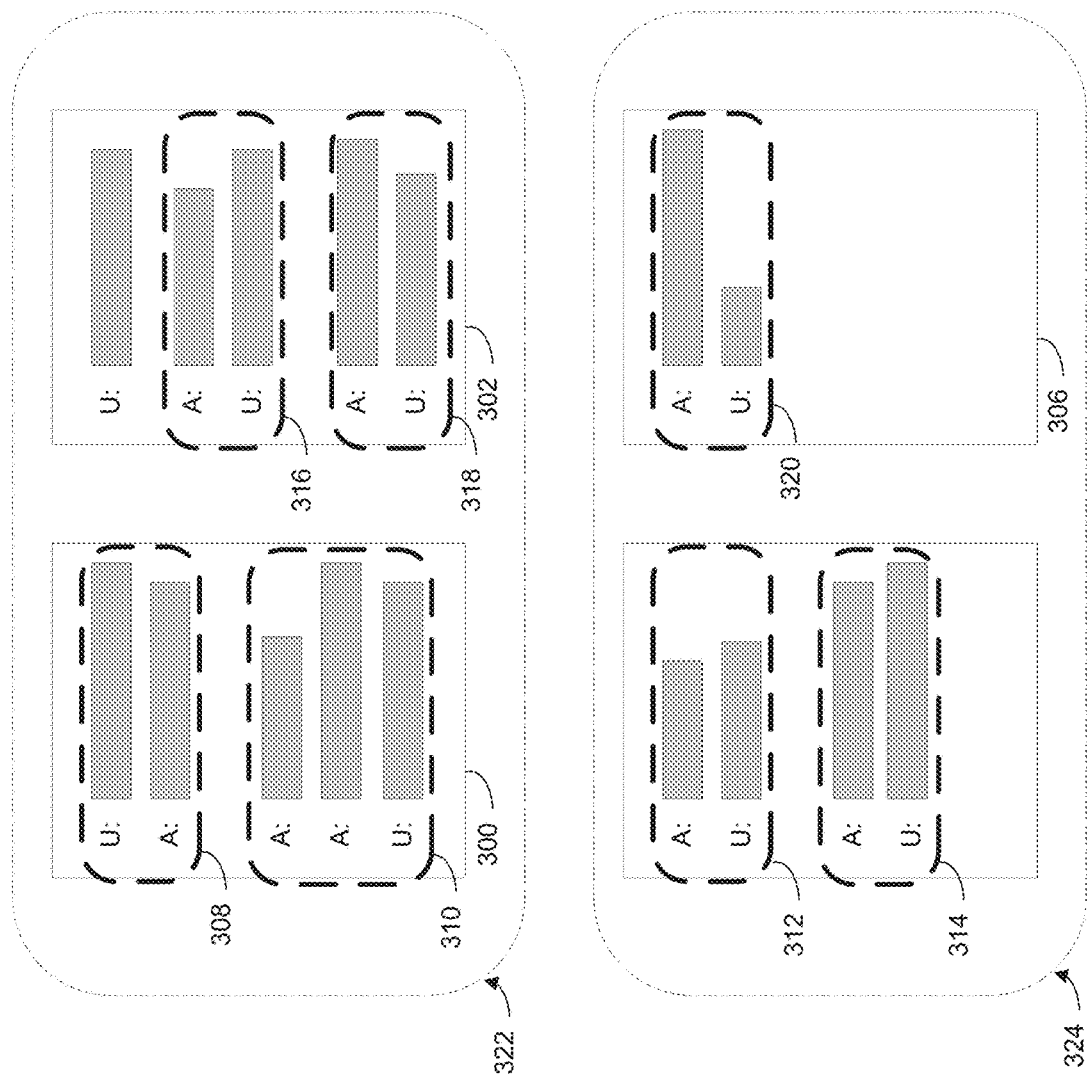
FIG. 3 is a diagrammatic view of a plurality of conversation data and a plurality of utterance pairs received by one implementation of the dialogue graph generation process of FIG. 1.

Referring also to FIG. 3, dialogue graph generation process 10 may receive 200 at a computing device, a plurality of conversation data. Conversation data may generally include text-based conversation data. As will be discussed in greater detail below, dialogue graph generation process 10 may generate one or more dialogue graphs representative of the potential flows between multiple parties in a conversation. For example, a virtual assistant may be utilized to provide customer assistance to the extent the virtual assistant is trained to understand and respond to user utterances. In some implementations, conversation data may be received 200 by dialogue graph generation process 10 from recorded conversations between multiple humans (e.g., a human customer and a human customer service agent) and/or a human and a virtual assistant (e.g., a human customer and a virtual assistant). While examples of conversation data between a customer and a customer service agent have been described, it will be appreciated that other conversation data between any number of individuals may be received within the scope of the present disclosure.

In some implementations, receiving 200 the plurality of conversation data may include one or more of receiving 206 a plurality of chat transcripts and converting 208 one or more audio recordings of one or more conversations into one or more text-based representations of the one or more conversations. For example, conversation data received 200 by dialogue graph generation process 10 may include multi-party chat transcripts or chat logs (e.g., chat transcripts 300, 302, 304, 306). In some implementations, conversation data may be received from an audio recording system. In some implementations, the audio recording system (e.g., audio recording system 64) may be configured to obtain audio recordings of one or more conversations between a plurality of individuals (e.g. a dialogue) using a microphone or other sound recording device(s).

In some implementations, dialogue graph generation process 10 may convert 208 the one or more audio recordings of one or more conversations into text-based logs or transcripts. In some implementations, dialogue graph generation process 10 may utilize a transcription engine (e.g., transcription engine 74) to convert 208 audio recordings into transcripts or logs representative of the conversation data. An example of a transcript engine may include, but is not limited to, the Nuance® Transcription Engine produced by Nuance Communications, Inc. By utilizing a transcription engine (e.g., transcription engine 74) to convert 208 audio recordings into text-based logs or transcripts, embodiments of dialogue graph generation process 10 may go directly from input speech conversations to dialogue graphs.

In some implementations, dialogue graph generation process 10 may cluster 202 a plurality of utterance pairs from the plurality of conversation data into a plurality of utterance pair clusters. Clustering may generally include grouping and/or organizing portions of the received 200 conversation data into representative groups or clusters based upon, at least in part, one or more similar properties. As will be discussed in greater detail below, the plurality of conversation data (e.g., chat transcripts 300, 302, 304, 306) may include utterances from a plurality of speakers. For example, a call between a customer and a customer service agent may include utterances from the customer and utterances from the customer service agent. Utterances may generally include speech and/or text content provided by and/or associated with each party during a conversation. Referring to FIG. 3 and in some implementations, dialogue graph generation process 10 may identify a plurality of utterance pairs from the plurality of conversation data. For example, dialogue graph generation process 10 may identify pairs of utterances (e.g., utterance pairs 308, 310, 312, 314, 316, 318, 320) from different parties (e.g., a customer and an agent) from the plurality of conversation data (e.g., chat transcripts 300, 302, 304, 306). In some implementations, dialogue graph generation process 10 may process at least a portion of the plurality of conversation data to identify the plurality of utterance pairs.

In some implementations, dialogue graph generation process 10 may concatenate adjacent or continuous utterances from a chat transcript into a single utterance pair. For example and referring to chat transcript 300 in FIG. 3. Suppose chat transcript 300 includes a plurality of utterances between a customer (e.g., represented as "U:") and a customer service agent (e.g., represented as "A:"). As this pair of utterances represents a single exchange of communication between the customer and the agent, dialogue graph generation process 10 may identify the pair of utterances as utterance pair 308. Continuing with this example, suppose chat transcript 300 includes a second exchange between the customer and the customer service agent where the customer speaks and subsequently, the customer service agent provides two utterances (e.g., one utterance with a threshold pause before a second utterance). In this example, dialogue graph generation process 10 may concatenate the customer service agent's two consecutive utterances to define an utterance pair (e.g., utterance pair 310) with the customer's utterance. In some implementations, an utterance pair may include a customer service agent utterance followed by a customer utterance. For example, in many business contexts where a customer is having a problem or has a question, a customer service agent may offer help and/or solutions. In this manner, the customer service agent may generally lead the conversation. However, it will be appreciated that a customer may lead certain conversations in certain contexts.

In some implementations, clustering 202 the plurality of utterance pairs from the plurality of conversation data into a plurality of utterance pair clusters may include clustering 210 the plurality of conversation data into a plurality of topic clusters. A topic cluster may generally include a group or grouping of conversation data (e.g., chat transcripts or chat logs) based upon, at least in part, a similar topic. For example and as will be described in greater detail below, dialogue graph generation process 10 may cluster 210 the plurality of conversation data (e.g., chat transcripts 300, 302, 304, 306) into topic clusters (e.g., topic clusters 322, 324). In some implementations, dialogue graph generation process 10 may process the plurality of conversation data (e.g., chat transcripts 300, 302, 304, 306) to identify the topic or an intent of each conversation. For example, a topic or intent of a dialogue or conversation may represent the main point or purpose for a conversation between multiple parties.

For example, suppose chat transcript 300 and chat transcript 302 are both recordings of customer service calls between customers and customer service agents regarding e.g., a declined credit card and that chat transcript 304 and chat transcript 306 are recordings of customer service calls between customers and customer service agents regarding e.g., opening a new checking account. As will be discussed in greater detail below, dialogue graph generation process 10 may process the plurality of conversation data to identify the topic or intent of each portion of conversation data. While topics may be representative of an entire chat transcript or chat log, it will be appreciated that various portions of a single chat transcript may include multiple, discrete topics. For example, a first portion of chat transcript 302 may include a user requesting assistance with e.g., a declined credit card and a second portion of chat transcript may include a user requesting assistance with e.g., opening a new checking account.

Figure 4:
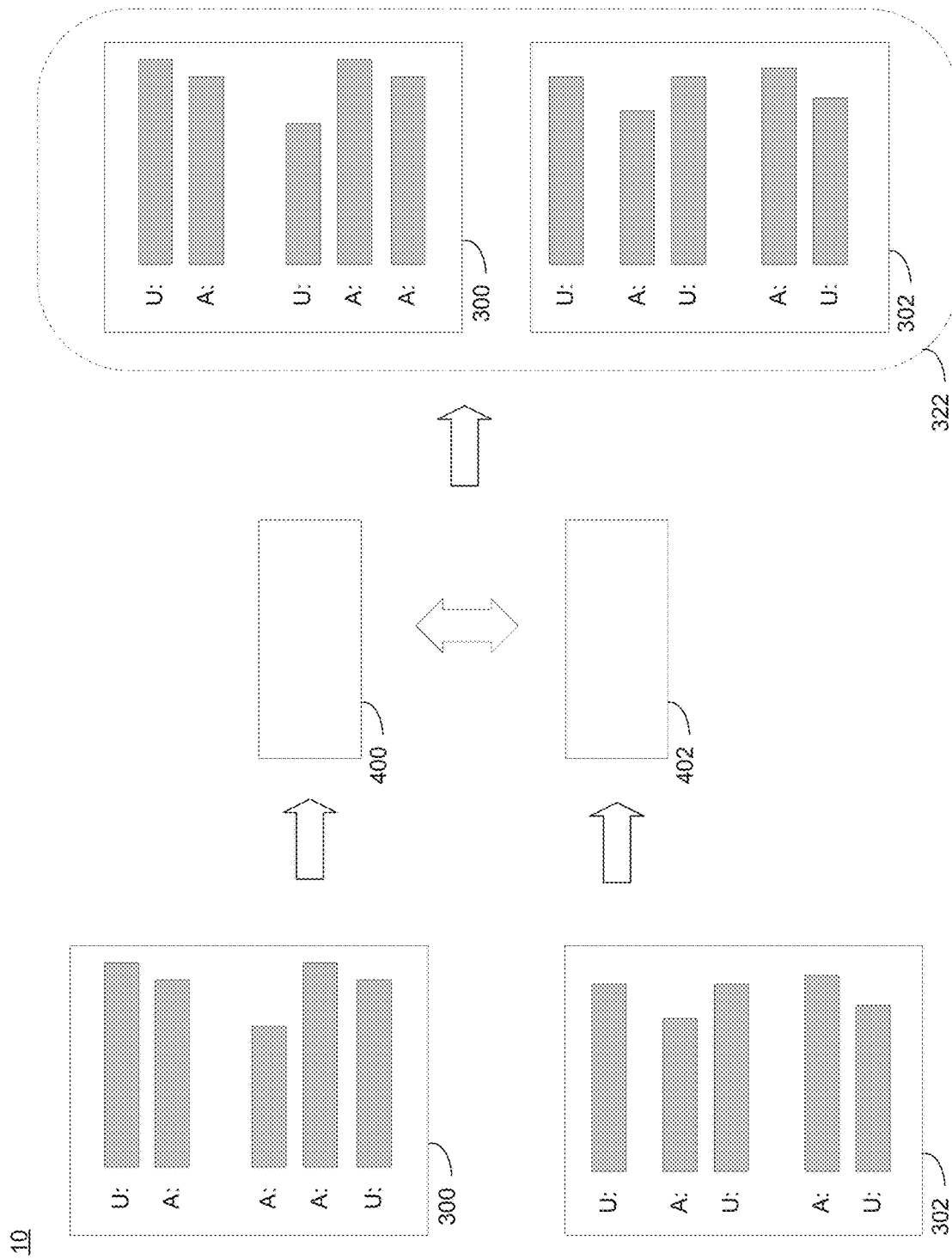
FIG. 4 is a diagrammatic view of clustering conversation data into a topic cluster according to one implementation of the dialogue graph generation process of FIG. 1.
Figure 5:
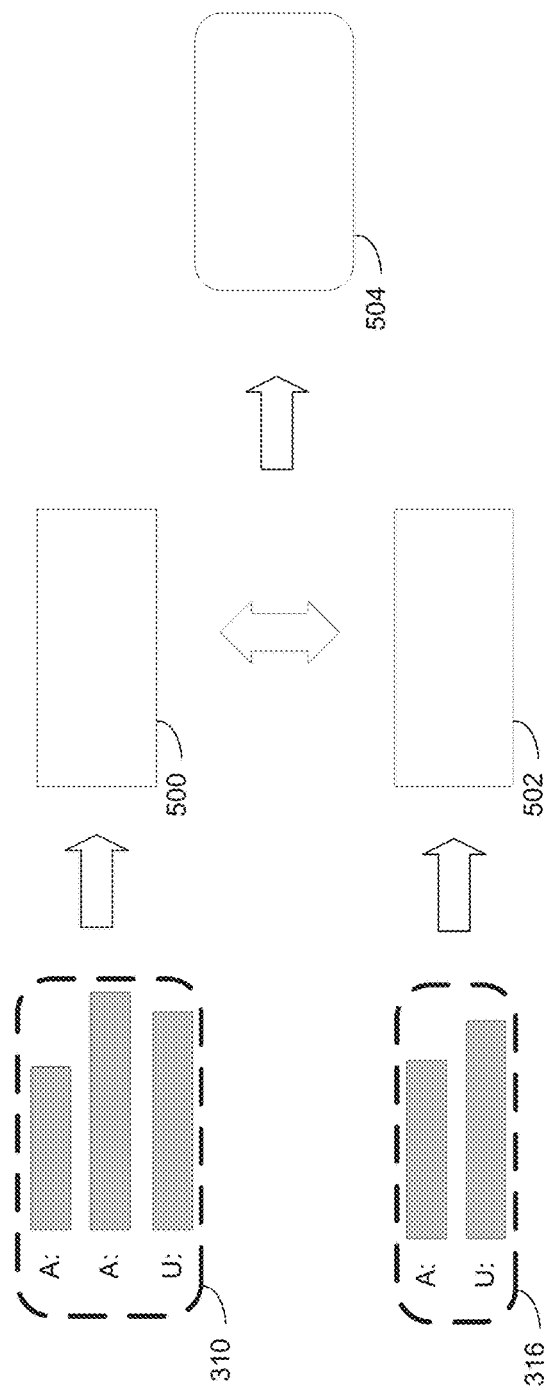
FIG. 5 is a diagrammatic view of clustering a plurality of utterance pairs into a utterance pair cluster according to one implementation of the dialogue graph generation process of FIG. 1.

In some implementations, clustering 210 the plurality of conversational data into a plurality of topic clusters may include generating 212 a plurality of feature vectors representative of the plurality of conversation data and comparing 214 the plurality of feature vectors representative of the plurality of conversation data. Referring also to FIG. 4 and in some implementations, dialogue graph generation process 10 may generate 212 a plurality of feature vectors by converting the plurality of conversation data (e.g., chat transcripts 300, 302) into a plurality of feature vectors (e.g., feature vectors 400, 402) representative of the plurality of conversation data. A feature vector may generally include a numerical representation (e.g., an n-dimensional vector) of data.

In some implementations, dialogue graph generation process 10 may compare 214 the plurality of feature vectors to determine whether portions of the plurality of conversational data have similar topics. In some implementations, dialogue graph generation process 10 may determine whether the plurality of feature vectors are semantically similar. Comparing the plurality of feature vectors may include comparing the plurality of feature vectors using one or more general statistical models such as latent Dirichlet allocation (LDA), term frequency—inverse document frequency (TF/IDF), the K-Means algorithm, etc. While a few example general statistical models have been described, it will be appreciated that various topic or intent discovery models, algorithms, processes, and/or methodologies may be used within the scope of the present disclosure.

In some implementations, dialogue graph generation process 10 may use pre-defined connections or relationships between words such as those defined by e.g., ConceptNet to determine the topic and/or intent of conversation data. ConceptNet is a multilingual knowledge base, representing words and phrases that people use and the common-sense relationships between them. For example, dialogue graph generation process 10 may compare 214 the plurality of feature vectors (e.g., feature vectors 400, 402) to determine that chat transcript 300 and chat transcript 302 have similar topics (e.g., similar based upon, at least in part, a threshold definition of similar). In some implementations, the topic similarity threshold may be pre-defined, may be a default threshold, and/or may be user-defined.

In some implementations, clustering 202 the plurality of utterance pairs into a plurality of utterance pair clusters includes for at least one topic cluster of the plurality of topic clusters, generating 216 a plurality of feature vectors representative of the plurality of utterance pairs and comparing 218 the plurality of feature vectors representative of the plurality of utterance pairs clusters. In some implementations and as discussed above, dialogue graph generation process 10 may generate 216 a plurality of feature vectors (e.g., feature vectors 500, 502) representative of the plurality of utterance pairs (e.g., utterance pairs 310, 316). While two feature vectors have been described, it will be appreciated that any number of feature vectors may be generated by dialogue graph generation process 10. As discussed above, dialogue graph generation process 10 may compare 218 the plurality of feature vectors (e.g., feature vectors 500, 502) to determine whether the utterance pairs are similar. As discussed above, comparing the plurality of feature vectors may include comparing the plurality of feature vectors using one or more general statistical models such as latent Dirichlet allocation (LDA), term frequency—inverse document frequency (TF/IDF), the K-Means algorithm, etc. Additionally, dialogue graph generation process 10 may use pre-defined connections or relationships between words such as those defined by e.g., ConceptNet to determine whether a plurality of utterance pairs are similar. In some implementations, dialogue graph generation process 10 may determine whether the plurality of utterance pairs are semantically similar and/or similar in position relative to other utterance pairs of the plurality of conversation data.

For example, suppose each of chat transcripts 300, 302, 304, 306 includes dialogue from a customer service agent thanking the customer for contacting the customer service agent and asking if the user needs help with anything else (e.g., utterance pairs 314, 318). Because this is usually at the end of a conversation, feature vectors generated for each utterance pair may define the relative position of each utterance pair. In this example, the feature vectors generated may define the relative position of utterance pairs 314, 318 at the end of each dialogue. In this manner, dialogue graph generation process 10 may also compare the relative position of each utterance pair as an additional factor upon which to determine whether or not utterance pairs are similar.

As will be discussed in greater detail below, a dialogue graph generated by embodiments of dialogue graph generation process 10 may represent various possible "paths" of a conversation. For example and as discussed above, dialogue graph generation process 10 may cluster 202 utterance pairs into utterance pair clusters based upon, at least in part, semantic and positional similarity. In one example, a plurality of conversation data may include various questions asked by a customer service agent to a customer regarding the customer's need for assistance. Based upon the customer's response, the conversation may proceed down various possible conversations originating from the same utterance by the customer service agent. In this manner, the relationship between utterance pair clusters may represent the flow of a conversation from utterance pair to utterance pair. In some implementations, dialogue graph generation process 10 may identify or highlight important transitions or relationships between various utterance pairs in the plurality of conversation data.

For example, suppose chat transcript 300 and chat transcript 302 each include dialogue from a customer service agent confirming e.g., the expiration date of the user's credit card (e.g., utterance pairs 310, 316). In some implementations and as discussed above, dialogue graph generation process 10 may determine that utterance pair 310 is similar to utterance pair 316. In response, dialogue graph generation process 10 may cluster 202 the plurality of similar utterance pairs (e.g., utterance pairs 310, 316) into a cluster (e.g., cluster 504).

Figure 6:
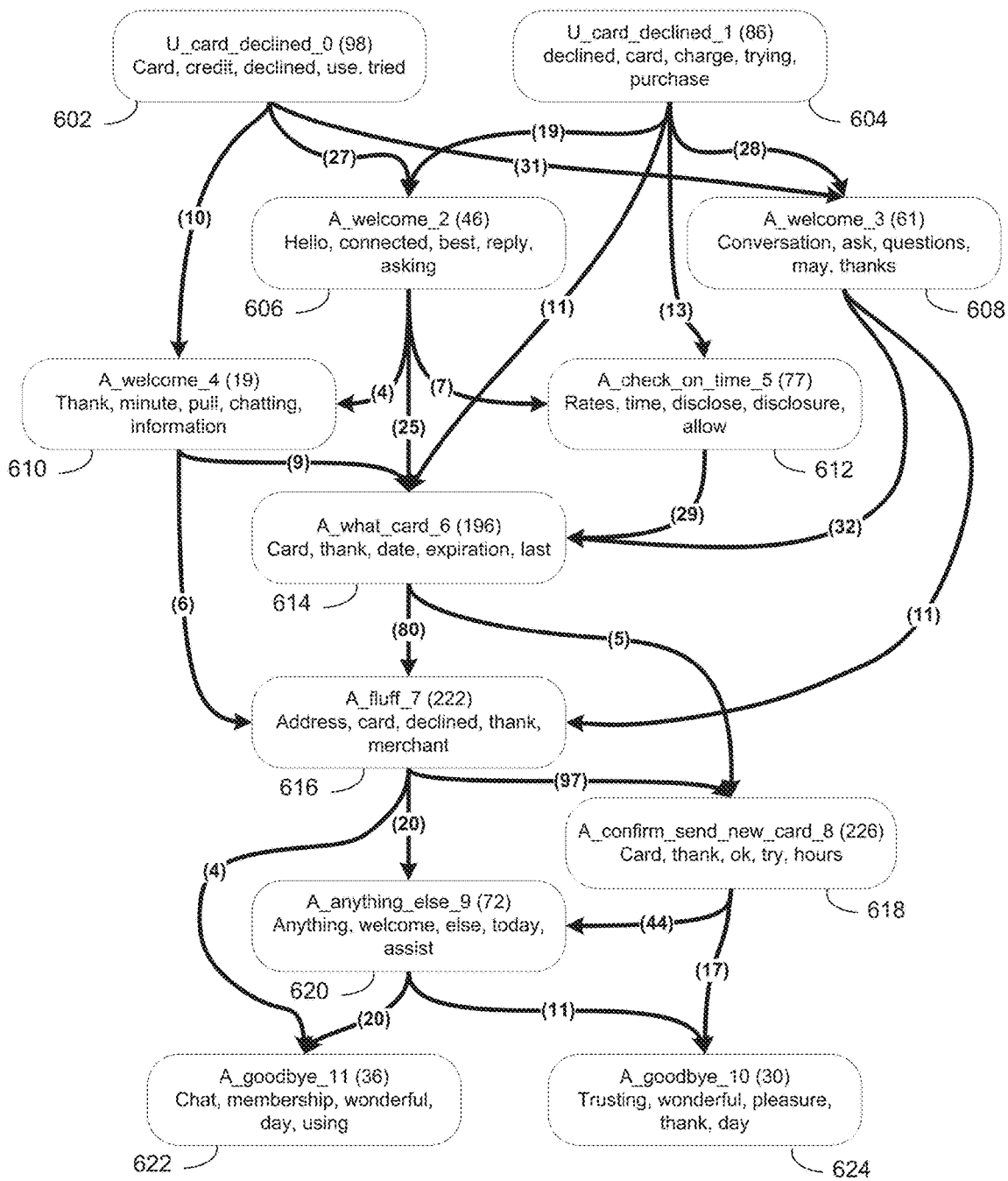
FIG. 6 is a diagrammatic view of a dialogue graph generated according to one implementation of the dialogue graph generation process of FIG. 1.

Referring also to FIG. 6 and in some implementations, dialogue graph generation process 10 may generate 204 a dialogue graph with a plurality of nodes representative of the plurality of utterance pair clusters. In some implementations, dialogue graph generation process 10 may generate 204 a dialogue graph (e.g., dialogue graph 600) with a plurality of nodes (e.g., nodes 602, 604, 606, 608, 610, 612, 614, 616, 618, 620, 622, 624) representative of the plurality of utterance pair clusters (e.g., utterance pair cluster 504). For example, dialogue graph generation process 10 may represent each utterance pair cluster in the dialogue graph (e.g., dialogue graph 600) with a separate node. In some implementations and as will be discussed in greater detail below, the node generated for each utterance pair cluster may include a label or other attachment including the utterance pairs of the utterance pair cluster. In some implementations, a dialogue graph may be generated 204 for each topic cluster defined by dialogue graph generation process 10. For example, dialogue graph generation process 10 may generate 204 a directed acyclic graph (DAG) to represent the dialogue from the plurality of conversation data. A directed acyclic graph may generally include a directed graph with nodes and edges, with each edge directed from one node to another, such that there is no way to start at any one node and follow a consistently-directed sequence of edges that eventually loops back to that node again. Equivalently, a DAG may be a directed graph that has a topological ordering (e.g., a sequence of the nodes such that every edge is directed from earlier to later in the sequence). For example, a sequence of nodes in the graph may be defined based on the position of the node from a first position (e.g., position "n"), to a next position (e.g., position "n+1"), and/or to an $m^{th}$ position (e.g., position "n+m"). As discussed above and in some implementations, the position of a utterance pair cluster within a plurality of conservation data may be used, at least in part, to define the position of the utterance pair cluster in the dialogue graph.

In some implementations, dialogue graph generation process 10 may generate 204 a graph with nodes representative of a plurality of utterance pair clusters and one or more edges between the plurality of nodes. For example, the edges between nodes may define paths in the plurality of conversation data from one utterance pair cluster to another utterance pair cluster. In this manner, dialogue graph generation process 10 may model or map various possible paths a conversation may take between multiple parties for a given topic from a given utterance pair. For example and as shown in FIG. 6, dialogue graph generation process 10 may cluster 202 a plurality of utterance pairs into a plurality of utterance pair clusters and may represent these clusters as nodes (e.g., nodes 602, 604, 606, 608, 610, 612, 614, 616, 618, 620, 622, 624) in a dialogue graph (e.g., dialogue graph 600). Each edge between the plurality of nodes may represent the sequence of utterance pair clusters for a given topic from utterance pair cluster to utterance pair cluster. In some implementations, each edge may be labeled with a number of times a first utterance pair cluster leads to a second utterance pair cluster. For example, for at least one node pair "(i, j)" (e.g., node pair (602, 610)) of the plurality of node pairs in the graph, dialogue graph generation process 10 may generate or create a link between node "i" (e.g., node 602) and node "j" (e.g., node 610) and add a label to that link or edge equal to the number of times an utterance pair cluster at position "n" is clustered in node 602 and the utterance pair at position "n+1" is clustered at node 610. As discussed above and for purposes of this example, the utterances associated with utterance pair cluster 602 may be determined to proceed the utterances associated with utterance pair cluster 610 within the plurality of conversation data. It will be appreciated that various utterance pair clusters may have various positions within the plurality of conversation data and/or relative to each other in the dialogue graph.

For example, suppose node 602 (which may represent an utterance pair cluster for an utterance pair involving a customer discussing e.g., a declined credit card) may be linked by an edge to node 610 (which may represent an utterance pair cluster for utterance pairs involving a customer service agent thanking the user for their request and their patience while the customer service agent pulls up information associated with the customer). In this example and for the received 200 conversation data, dialogue graph generation process 10 may determine that the utterances of the utterance pair cluster represented by node 602 are followed by the utterances of the utterance pair cluster represented by node 610 a total of e.g., ten times. As such, this node pair (e.g., node 602, node 610) may include an edge labeled with "10" representative of the number of times the utterance pair cluster 504 is clustered at a first position (e.g., position "n") in e.g., node 602 and that the utterance pair cluster is clustered at a next-sequential position (e.g., position "n+1") in e.g., node 610.

In another example, node 602 (which may represent an utterance pair cluster for an utterance pair involving a customer discussing e.g., a declined credit card) may be linked by an edge to node 608 (which may represent an utterance pair cluster for utterance pairs involving a customer service agent requesting permission from the customer to ask a few additional questions). In this example and for the received 200 conversation data, dialogue graph generation process 10 may determine that the utterance pair cluster represented by node 602 is followed by the utterance pair cluster represented by node 608 a total of e.g., 31 times. It will be appreciated that various labels, descriptions, and/or identifiers may be provided by dialogue graph generation process 10 to represent the strength of the relationship between utterance pair clusters from a plurality of conversation data.

In some implementations, dialogue graph generation process 10 may generate 220 one or more labels for at least one node of the plurality of nodes representative of the plurality of utterance pair clusters. For example and in some implementations, dialogue graph generation process 10 may automatically generate 220 or add labels to the plurality of nodes to describe the utterance pair cluster represented by the plurality of nodes. In some implementations, dialogue graph generation process 10 may identify one or more important keywords and/or popular n-grams associated with the plurality of nodes. For example, dialogue graph generation process 10 may general statistical models (e.g., TF/IDF) to identify unique or important keywords from the utterance pair cluster. In some implementations, dialogue graph generation process 10 may provide a threshold number of important keywords as a label for the plurality of nodes. The label for the plurality of nodes may include individual definitions and/or graph-wide definitions for the threshold number of important keywords to include as a label for the plurality of nodes. In some implementations, the threshold number of important keywords may be a default threshold and/or may be user-defined via a user interface. For example, dialogue graph generation process 10 may provide e.g., five important keywords for automatically generated labels for the plurality of nodes of the dialogue graph (e.g., dialogue graph 600).

In some implementations, dialogue graph generation process 10 may receive 222 one or more modifications to the dialogue graph. In some implementations, dialogue graph generation process 10 may provide the dialogue graph (e.g., dialogue graph 600) in a user interface for users to review and/or modify. In some implementations, dialogue graph generation process 10 may provide one or more annotation tools, buttons, features, etc. in the user interface for annotating the generated dialogue graph.

In some implementations, dialogue graph generation process 10 may merge a plurality of nodes that include similar utterance pairs. For example, suppose a user believes that dialogue graph generation process 10 generates a dialogue graph with too many utterance pair clusters that are not sufficiently unique. In this example, a user may provide a command (e.g., a button, voice-command, etc.) in a user interface to merge a plurality of nodes that include similar utterance pairs.

In some implementations, dialogue graph generation process 10 may split one or more nodes into a plurality of nodes representative of distinct utterance pair clusters. For example, suppose a user believes that dialogue graph generation process 10 generates a dialogue graph with too few utterance pair clusters to demonstrate additional unique utterance pairs in a plurality of conversation data. In this example, a user may provide a command (e.g., a button, voice-command, etc.) in a user interface to split one or more nodes into separate nodes representative of distinct utterance pairs clusters.

In some implementations, dialogue graph generation process 10 may add and/or remove edges or connections between nodes of the dialogue graph. For example, suppose a user believes that dialogue graph generation process 10 generates a dialogue graph that fails to include a specific path in a conversation between various utterance pair clusters. In this example, a user may provide a command (e.g., a button, voice-command, etc.) in a user interface to add an edge between a plurality of nodes (e.g., selected by the user). In another example, suppose a user believes that dialogue graph generation process 10 generates a dialogue graph that includes unnecessary paths or unlikely paths in a conversation between various utterance pair clusters. In this example, a user may provide a command (e.g., a button, voice-command, etc.) in a user interface to remove an edge between a plurality of nodes (e.g., selected by the user).

In some implementations, dialogue graph generation process 10 may delete one or more nodes from the dialogue graph. For example, suppose a user believes that dialogue graph generation process 10 generates a dialogue graph with an unnecessary or unlikely utterance pair cluster. In this example, a user may provide a command (e.g., a button, voice-command, etc.) in a user interface to remove a node from the dialogue graph.

In some implementations, dialogue graph generation process 10 may generate a log of modifications made to the dialogue graph. For example, dialogue graph generation process 10 may generate a log (e.g., log 76) in response to receiving one or more modifications to the dialogue graph. In this manner, dialogue graph generation process 10 may generate a log to help developers better understand what steps are necessary to go from an automatically generated dialogue graph to a dialogue graph that is ready for developing virtual assistant dialogue. In some implementations, dialogue graph generation process 10 may export the dialogue graph to one or more automatic virtual assistant design applications and/or one or more automatic dialogue generation applications. For example, dialogue graph generation process 10 may export the dialogue graph by converting the dialogue graph into a format suitable for an automatic virtual assistant design application and/or an automatic dialogue generation application. In this manner, dialogue for a virtual assistant may be automatically generated directly from a plurality of conversation data used to generate 204 a dialogue graph which may be used by an automatic virtual assistant design application and/or an automatic dialogue generation application to generate dialogue for a virtual assistant.

In some implementations, dialogue graph generation process 10 may use machine learning to improve the clustering and/or the dialogue graph generation based upon, at least in part, user interaction with the dialogue graph (e.g., user selections, labels added, modifications made, etc.). For example, dialogue graph generation process 10 may collect data from the interaction of various users with the generated dialogue graph and may record the operations (e.g., modifications) conducted on the dialogue graph. In some implementations, dialogue graph generation process 10 may provide or "feed" this interaction data to a machine learning system (e.g., machine learning system 78) to identify patterns in the user interaction. As known in the art, a machine learning system may generally include a computing system, algorithm, or process configured to "learn" via supervised learning or unsupervised learning. Supervised learning may generally include a computing system, algorithm, or process configured to "learn" from input data and training data to define expected outputs or patterns for the input data. Unsupervised learning may generally include a computing system, algorithm, or process configured to "learn" by developing its own pattern from the input data. From these patterns identified by the machine learning system (e.g., machine learning system 78), dialogue graph generation process 10 may improve the output of the topic clusters, utterance pair clusters, generation of node pairs, and/or generation of node labels to more accurately reflect how users modify dialogue graphs.

Figure 7:
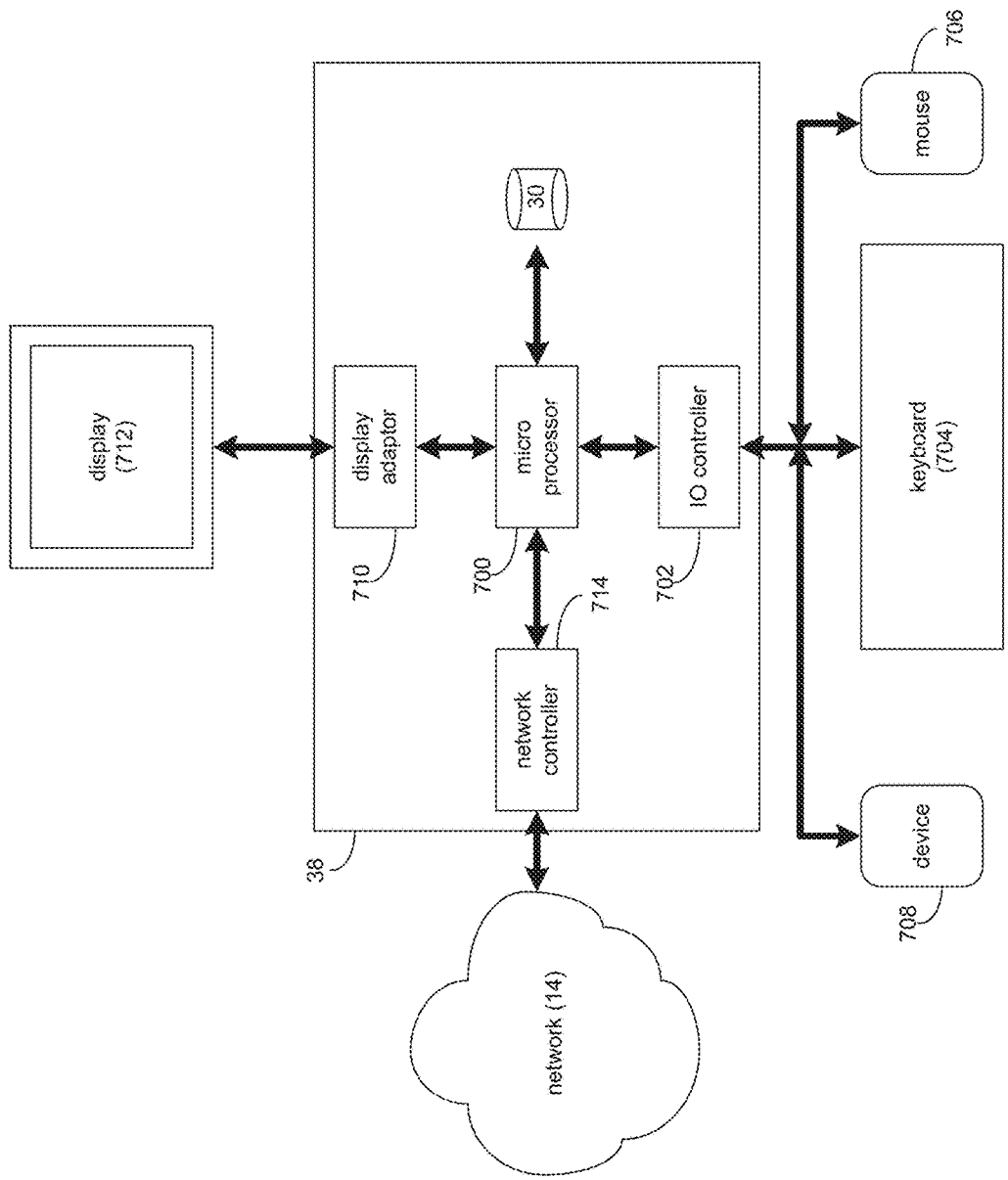
FIG. 7 is an example diagrammatic view of a client electronic device of FIG. 1 according to one or more example implementations of the disclosure.

Referring also to FIG. 7, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, dialogue graph generation process 10 may be substituted for client electronic device 38 within FIG. 7, examples of which may include but are not limited to computing device 12 and/or client electronic devices 40, 42, 44.

Client electronic device 38 may include a processor and/or microprocessor (e.g., microprocessor 700) configured to, e.g., process data and execute the above-noted code/instruction sets and subroutines. Microprocessor 700 may be coupled via a storage adaptor (not shown) to the above-noted storage device(s) (e.g., storage device 30). An I/O controller (e.g., I/O controller 702) may be configured to couple microprocessor 700 with various devices, such as keyboard 704, pointing/selecting device (e.g., mouse 706), custom device, such a microphone (e.g., device 708), USB ports (not shown), and printer ports (not shown). A display adaptor (e.g., display adaptor 710) may be configured to couple display 712 (e.g., CRT or LCD monitor(s)) with microprocessor 700, while network controller/adaptor 714 (e.g., an Ethernet adaptor) may be configured to couple microprocessor 700 to the above-noted network 14 (e.g., the Internet or a local area network).

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for automatically generating a dialogue graph, executed on a computing device, comprising:

receiving, at the computing device, a plurality of conversation data;
clustering the plurality of conversation data into a plurality of topic clusters;
clustering a plurality of utterance pairs from the plurality of conversation data into a plurality of utterance pair clusters, wherein each utterance pair represents at least a portion of a single exchange between a plurality of participants associated with the conversation data, wherein clustering the plurality of utterance pairs from the plurality of conversation data into the plurality of utterance pair clusters includes:
for at least one topic cluster of the plurality of topic clusters, converting the plurality of utterance pairs into a plurality of feature vectors representative of the plurality of utterance pairs, and
comparing the plurality of feature vectors representative of the plurality of utterance pairs;
generating a dialogue graph with a plurality of nodes representative of the plurality of utterance pair clusters;
receiving one or more modifications to the dialogue graph, the one or more modifications including one or more of:
a selection of a plurality of nodes to merge, and
a selection of a node from the plurality of nodes to split into separate nodes representative of distinct utterance pairs clusters; and
performing the one or more modifications on the dialogue graph.

2. The computer-implemented method of claim 1, wherein receiving the plurality of conversation data includes one or more of:
receiving a plurality of chat transcripts; and
converting one or more audio recordings of one or more conversations into one or more text-based representations of the one or more conversations.

3. The computer-implemented method of claim 1, wherein clustering the plurality of conversational data into a plurality of topic clusters includes:
generating a plurality of feature vectors representative of the plurality of conversation data; and
comparing the plurality of feature vectors representative of the plurality of conversation data.

4. The computer-implemented method of claim 1, further comprising:
generating one or more labels for at least one node of the plurality of nodes representative of the plurality of utterance pair clusters.

5. A computer program product residing on a non-transitory computer readable medium having a plurality of instructions stored thereon which, when executed by a processor, cause the processor to perform operations comprising:
receiving a plurality of conversation data;
clustering the plurality of conversation data into a plurality of topic clusters;
clustering a plurality of utterance pairs from the plurality of conversation data into a plurality of utterance pair clusters, wherein each utterance pair represents at least a portion of a single exchange between a plurality of participants associated with the conversation data, wherein clustering the plurality of utterance pairs from the plurality of conversation data into the plurality of utterance pair clusters includes:
for at least one topic cluster of the plurality of topic clusters, converting the plurality of utterance pairs into a plurality of feature vectors representative of the plurality of utterance pairs, and
comparing the plurality of feature vectors representative of the plurality of utterance pairs;
generating a dialogue graph with a plurality of nodes representative of the plurality of utterance pair clusters;
receiving one or more modifications to the dialogue graph, the one or more modifications including one or more of:
a selection of a plurality of nodes to merge, and
a selection of a node from the plurality of nodes to split into separate nodes representative of distinct utterance pairs clusters; and
performing the one or more modifications on the dialogue graph.

6. The computer program product of claim 5, wherein receiving the plurality of conversation data includes one or more of:
receiving a plurality of chat transcripts; and
converting one or more audio recordings of one or more conversations into a text-based representation of the one or more conversations.

7. The computer program product of claim 5, wherein clustering the plurality of conversational data into a plurality of topic clusters includes:
generating a plurality of feature vectors representative of the plurality of conversation data; and
comparing the plurality of feature vectors representative of the plurality of conversation data.

8. The computer program product of claim 5, further comprising:
generating one or more labels for at least one node of the plurality of nodes representative of the plurality of utterance pair clusters.

9. A computing system including a processor and memory configured to perform operations comprising:
receiving a plurality of conversation data;
clustering the plurality of conversation data into a plurality of topic clusters;
clustering a plurality of utterance pairs from the plurality of conversation data into a plurality of utterance pair clusters, wherein each utterance pair represents at least a portion of a single exchange between a plurality of participants associated with the conversation data, wherein clustering the plurality of utterance pairs from the plurality of conversation data into the plurality of utterance pair clusters includes:
for at least one topic cluster of the plurality of topic clusters, converting the plurality of utterance pairs into a plurality of feature vectors representative of the plurality of utterance pairs, and
comparing the plurality of feature vectors representative of the plurality of utterance pairs;
generating a dialogue graph with a plurality of nodes representative of the plurality of utterance pair clusters;
receiving one or more modifications to the dialogue graph, the one or more modifications including one or more of:
a selection of a plurality of nodes to merge, and
a selection of a node from the plurality of nodes to split into separate nodes representative of distinct utterance pairs clusters; and
performing the one or more modifications on the dialogue graph.

10. The computing system of claim 9, wherein receiving the plurality of conversation data includes one or more of:

receiving a plurality of chat transcripts; and converting one or more audio recordings of one or more conversations into a text-based representation of the one or more conversations.

11. The computing system of claim 9, wherein clustering the plurality of conversational data into a plurality of topic clusters includes:

generating a plurality of feature vectors representative of the plurality of conversation data; and comparing the plurality of feature vectors representative of the plurality of conversation data.

12. The computing system of claim 9, further comprising:

generating one or more labels for at least one node of the plurality of nodes representative of the plurality of utterance pair clusters.

* * * * *